J. BLAEKER.
ROTARY TURBINE ENGINE.
APPLICATION FILED DEC. 30, 1909.
974,634.
Patented Nov. 1, 1910.
2 SHEETS—SHEET 1.
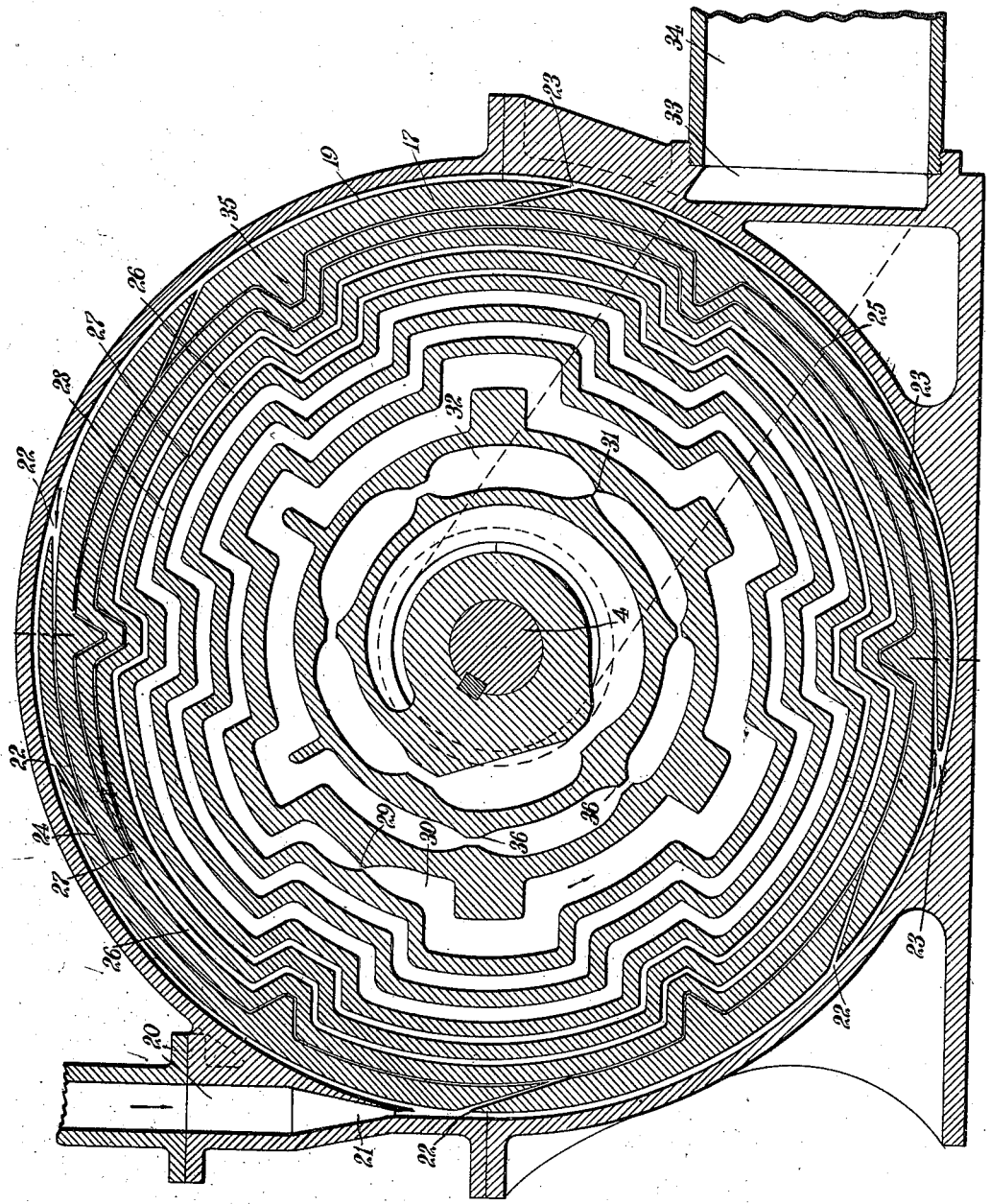
WITNESSES:
INVENTOR
Joseph Blaeker
BY
ATTORNEYS

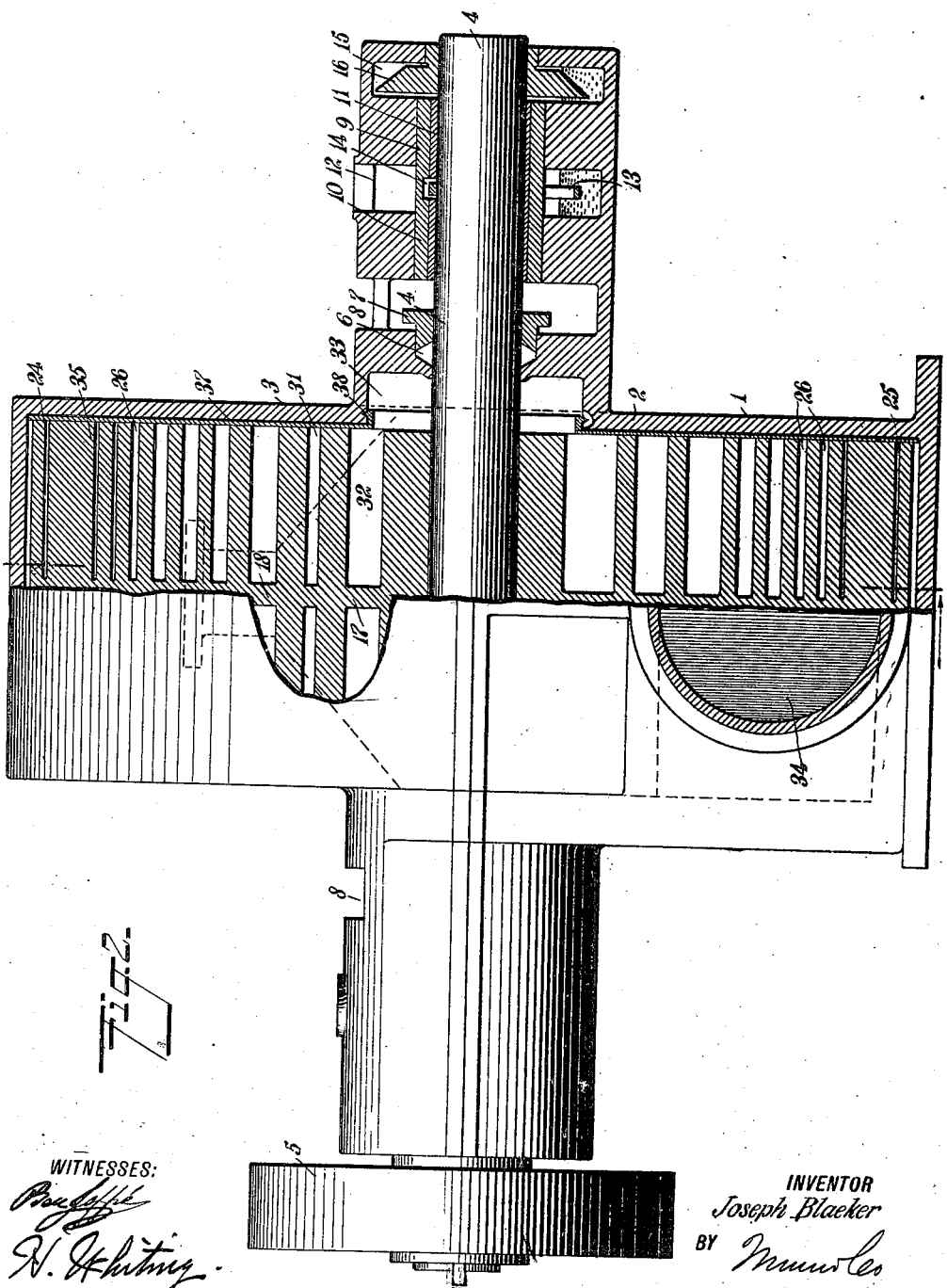

UNITED STATES PATENT OFFICE.

JOSEPH BLAEKER, OF NEW YORK, N. Y.

ROTARY TURBINE-ENGINE.

974,634.  Specification of Letters Patent.  Patented Nov. 1, 1910.

Application filed December 30, 1909. Serial No. 535,578.

*To all whom it may concern:*

Be it known that I, JOSEPH BLAEKER, a subject of the Czar of Russia, and a resident of the city of New York, borough of Brooklyn, in the county of Kings and State of New York, have invented a new and Improved Rotary Turbine-Engine, of which the following is a full, clear, and exact description.

This invention relates to a new and improved motor of the rotary turbine type, which is adapted to utilize a motive fluid under pressure, such as steam, exploded gas or the like, to rotate a member by passing the fluid under pressure through spiral or circular passages in a ribbon-like form, and successively expanding the fluid to double its volume, and thereby converting the potential energy therein to kinetic energy, which is absorbed by the walls in the passages and walls formed by abutments extending across the passages.

An object of this invention is to provide a device in which the potential energy in a fluid under pressure is absorbed by a rotor, by successively passing the fluid from the periphery of said rotor in a spiral manner to the central axis thereof, gradually absorbing the kinetic force of the fluid by its impact against the spiral wall, and by offering successive abutments thereto.

A further object of this invention is to provide a rotary engine, in which a fluid under pressure is passed successively from the periphery of a rotor to the center thereof in a spiral manner, and in which the potential energy stored in the fluid is transformed into kinetic energy, by successively expanding the fluid through suitable nozzles.

A still further object of this invention is to provide a rotary turbine engine with twin passages, whereby the thrust of one portion thereof will be counterbalanced by the thrust of the opposite portion.

A still further object of this invention is to provide a device which will be simple in construction, inexpensive to manufacture, strong, durable, highly efficient in its operation, and capable of working under a comparatively low pressure and at a comparatively slow speed.

These and further objects, together with the construction and combination of parts, will be more fully described hereinafter and particularly set forth in the claims.

Reference is to be had to the accompanying drawings forming a part of this specification, in which similar characters of reference indicate corresponding parts in both views, and in which—

Figure 1 is a vertical section on the line indicated in Fig. 2; and Fig. 2 is a view, partly in section, on the line indicated in Fig. 1.

Referring more particularly to the separate parts of the device, 1 indicates a suitable casing, which is preferably formed in two parts 2 and 3, and forms in each end bearings for a shaft 4, which is provided with a suitable pulley or other driving member 5, whereby the power transmitted to the shaft 4 may be distributed. Where the shaft enters the interior of the casing 1 on each side thereof, there are provided stuffing boxes 6, which are adapted to prevent the leakage of the operating fluid from the interior of the casing, and the follower 7 of which may be removed through an opening 8 of sufficient magnitude, formed in the casing 1.

The bearings for the shaft, of which there is one on each side thereof, are indicated at 9, and consist of a Babbitt sleeve 10, which is provided with a longitudinal groove, in which extends fabric packing 11, whereby the oil may travel adjacent to the shaft 4.

In order to oil the shaft 4, there is provided an oiling cavity 12, arranged in the casing 1, in which dips a suitable ring 13 loosely mounted on the shaft 4 and extending through an arcuate groove 14 in the sleeve 10. The oil dipped up by the ring 13 passes through the slots in the sleeve 10 and falls into a cavity 15, where it is carried up by a collar 16 which prevents end thrust on the shaft 4, and slides down between the side of the collar and the casing to prevent friction.

Secured on the shaft 4 in the casing 1, there is provided a rotor 17, which is provided with twin passages on each side of a central diaphragm 18, so that the pressure on each side of the wheel will be balanced and thereby offer no end thrust on the shaft 4. Between the outer periphery of the rotor 17 and the inner surface of the casing 1, there is provided a slight motive-fluid space 19, which is provided with a suitable motive fluid, such as steam, air under pressure, or even exploded combustion gas, by means of a suitable nozzle 20, which has an opening 21 extending tangentially into the steam space 19. The steam is let into the rotor 17 at a plurality of points on its circumference, indicated at 22 and 23, where it travels in spiral passages 24 and 25, which converge to a common passage 26 at 27. The motive fluid, which is preferably steam, circulates in the passage 26, which extends in gradually decreasing spiral a sufficient number of turns to use up the kinetic energy of the steam at the pressure at which it entered the rotor from the nozzle 20. At the end of the passage 26, there is provided a nozzle 27, which is constricted to compress the motive fluid passed therethrough slidingly and then expand it suddenly into a passage 28 on the opposite side, which is preferably twice the size of the passage 26. Here the kinetic energy developed by the lowering of the pressure and the increase in volume of the motive fluid will be again utilized to exert its force on the continually decreasing and changing inner surface of the walls of the passage, which extends a number of turns sufficient to utilize the kinetic energy developed at the beginning of the passage. At the end of this passage 28, there is also provided another nozzle 29, which again converts the potential energy in the motive fluid by expanding it suddenly to twice its volume in a passage 30, located beyond the nozzle 29. A third expansion is provided by means of a nozzle 31 located at the end of the passage 30, whereby the remaining pressure in the motive fluid can be converted into kinetic energy or velocity by again expanding the motive fluid to double its volume in a passage 32 located beyond the passage 30. From the end of the passage 32 which extends spirally adjacent the shaft 4, the fluid passes out through a passage 33, which may be termed the "exhaust" passage, out through the exhaust passage 34. As has been stated above, the passages are arranged in pairs on each side of the diaphragm 18, so that the pressure will be counterbalanced on the rotor 17, and there is therefore provided on each side of the rotor the exhaust passages 33, which connect with the exhaust pipe 34.

While the full force of the motive fluid might be utilized by its abutment against the constantly changing walls of the passages, which extend in a spiral manner from the periphery to the center, it has been found advisable to offer obstructions to the continuous passage of the fluid, thereby causing the fluid to abut against the positive faces, exerting a more positive rotating force on the rotor 17. For this purpose, there has been provided a plurality of abutments 35, which extend across the various passages, causing the fluid to strike against the walls of said abutments and thus transmit positive impulses to the rotor 17. It is to be noted that these abutments are so formed that they provide dips in the passages, which gradually increase in circumferential length from the periphery toward the center until they reach the end of the passage 30, where there are substituted therefor a plurality of constricted passages 36, the walls of which offer abutments for the on-coming motive fluid, thereby positively transmitting the force therein. It may be desirable to substitute these constricted passages 36 throughout the entire passage of the rotor in order to obtain an efficient action of the device.

The outer sides of the passages in the rotor 17 are closed on each side of said rotor by circular plates 37, which are secured to the rotor in any well known manner, and which are provided with central openings, through which the exhaust steam or other motive fluid passes to the exhaust chamber 33, and which are further provided with circular dovetailed rings 38, adapted to engage corresponding grooves in the casing 1, which are filled with a suitable fluid taken up by the ring 38 and held there by centrifugal force, and thereby prevent the leakage of the motive fluid.

The operation of the device will be readily understood when taken in connection with the above description. The operating fluid, such as steam, is admitted under pressure through the nozzle 20 into the steam space 19. This steam, which may be about 80 pounds gaged pressure, passes into the rotor 17 and circulates in a gradually decreasing ribbon-like stream through the passages 24 and 25, and converges into the common passage 26. The steam circulates in this passage 26 until it reaches the nozzle 27, at which time the kinetic energy or velocity due to its expansion at that pressure will have been utilized in rotating the rotor 17, both by contact with the gradually changing walls of the spiral passage and by direct impact against the walls formed by the abutments 35. The steam, after passing through the nozzle 27, will expand to a volume twice that which it previously occupied, thereby converting a portion of its potential force into velocity or kinetic force, and thereby circulating faster in an ever-decreasing spiral, striking against the gradually changing walls of the passages and impacting against the walls formed by the walls 35. This continues until the steam, having utilized all of its kinetic force, again reaches the nozzle 29, where it is again expanded and a portion of its potential force changed to kinetic force. This occurs once more at the nozzle 31, where the pressure will be diminished to almost absolutely zero if a vacuum condenser is used. By this means an almost perfect adiabatic expansion thereof may be obtained, and the full force of the steam utilized to rotate the rotor 17.

By reason of the perfect bearing provided, the shaft 4 will be kept well lubricated, and will run in a smooth and efficient manner.

While I have shown one embodiment of my invention, I do not wish to be limited to the specific details and construction thereof, but desire to be protected in various changes, modifications and alterations which I may make within the scope of the appended claims.

Having thus described my invention, I claim as new and desire to secure by Letters Patent:—

1. In a device of the class described, the combination with a casing, of a rotor in said casing, said rotor having a passage extending spirally in successive winds from the periphery to the center thereof, a motive fluid inlet for said rotor adjacent the periphery thereof, and an outlet for said rotor adjacent the center thereof.

2. In a device of the class described, the combination with a casing, of a rotor rotatably in said casing, said rotor having a passage extending from adjacent the periphery to adjacent the center thereof in a gradually decreasing spiral manner, and said passage having abutting walls to form impact surfaces, a motive fluid inlet for said rotor adjacent the periphery thereof, and an outlet for said rotor adjacent the center thereof.

3. In a device of the class described, the combination with a casing, of a rotor, said rotor having a spiral passage extending from the periphery to adjacent the center thereof, said passage having a plurality of constricted portions for forming impact abutments therein, a motive fluid inlet for said rotor adjacent the periphery thereof, and an outlet for said rotor adjacent the center thereof.

4. In a device of the class described, the combination with a casing, of a rotor rotatably connected to said casing, said rotor having a plurality of spiral passages, forming continuations of each other, each successive passage being larger than the next preceding passage, a motive fluid inlet for said rotor adjacent the periphery thereof, and an outlet for said rotor adjacent the center thereof.

5. In a device of the class described, the combination with a support, of a rotor rotatably connected to said support, said rotor having a plurality of passages therein forming continuations of each other, each successive passage being twice the cross-sectional area of the preceding passage.

6. In a device of the class described, the combination with a support, of a rotor rotatably connected to said support, said rotor having a plurality of passages therein forming continuations of each other, each successive passage being twice the cross-sectional area of the preceding passage, and expanding nozzles arranged between said passages.

7. In a device of the class described, the combination with a support, of a rotor rotatably connected to said support, said rotor having a spiral passage therein and having a plurality of inlets to said passage.

8. In a device of the class described, the combination with a support, of a rotor rotatably connected to said support, said rotor having a passage therein increasing in cross-sectional area by successive steps, and having abutments forming impact walls for said passage.

9. In a device of the class described, the combination with a support, of a rotor rotatably connected to said support, said rotor having a spiral passage therein increasing by successive steps in cross-sectional area.

10. In a device of the class described, the combination with a casing, of a rotor connected to said support, said rotor having a pair of spiral passages arranged in opposition on opposite sides thereof, said spiral passages extending from adjacent the periphery to substantially adjacent the center of said rotor, a motive fluid inlet for said rotor adjacent the periphery thereof, and an outlet for said rotor adjacent the center thereof.

11. In a device of the class described, the combination with a casing, of a rotor rotatably supported in said casing, and means for supplying a motive fluid under pressure to said casing, said rotor having a passage extending from the periphery thereof to adjacent the center thereof in a jagged spiral manner, a motive fluid inlet for said rotor adjacent the periphery thereof, and an outlet for said rotor adjacent the center thereof.

12. In a device of the class described, the combination with a casing, of a shaft rotatably supported in said casing, lubricating bearings for said shaft, a rotor secured to said shaft, and means for supplying a motive fluid to said casing, said rotor having a plurality of jagged spiral passages extending from the periphery thereof to adjacent the center thereof.

13. In a device of the class described, the combination with a casing, of a shaft rotatably supported in said casing, a rotor secured to said shaft, and means for supplying a motive fluid to said casing, said rotor having a jagged spiral passage extending from the periphery to adjacent the center thereof, and said passage being constructed so as to successively expand the motive fluid by steps.

In testimony whereof I have signed my name to this specification in the presence of two subscribing witnesses.

JOSEPH BLAEKER.

Witnesses:
 HORATIO WHITING,
 PHILIP D. ROLLHAUS.